US012432502B2

(12) United States Patent
Liu et al.

(10) Patent No.: US 12,432,502 B2
(45) Date of Patent: Sep. 30, 2025

(54) SOUND PRODUCTION APPARATUS AND ELECTRONIC DEVICE

(71) Applicant: GOERTEK INC., Shandong (CN)

(72) Inventors: Chunfa Liu, Shandong (CN); Jianbin Yang, Shandong (CN); Jianxin Wang, Shandong (CN); Shousong Qiang, Shandong (CN)

(73) Assignee: GOERTEK INC., Weifang (CN)

( * ) Notice: Subject to any disclaimer, the term of this patent is extended or adjusted under 35 U.S.C. 154(b) by 192 days.

(21) Appl. No.: 17/999,887

(22) PCT Filed: Nov. 7, 2020

(86) PCT No.: PCT/CN2020/127322
§ 371 (c)(1),
(2) Date: Nov. 25, 2022

(87) PCT Pub. No.: WO2021/238072
PCT Pub. Date: Dec. 2, 2021

(65) Prior Publication Data

US 2023/0239631 A1 Jul. 27, 2023

(30) Foreign Application Priority Data

May 25, 2020 (CN) ......................... 202010458315.6

(51) Int. Cl.
*H04R 9/06* (2006.01)
*H04R 1/28* (2006.01)
(Continued)

(52) U.S. Cl.
CPC ............... *H04R 9/06* (2013.01); *H04R 1/288* (2013.01); *H04R 9/025* (2013.01); *H04R 9/046* (2013.01)

(58) Field of Classification Search
CPC .......... H04R 9/06; H04R 1/288; H04R 9/025; H04R 9/046
See application file for complete search history.

(56) References Cited

U.S. PATENT DOCUMENTS

2005/0194203 A1 9/2005 Muto et al.
2019/0304433 A1* 10/2019 Wang ...................... B06B 1/045

FOREIGN PATENT DOCUMENTS

CN 201608872 U 10/2010
CN 202721819 U 2/2013
(Continued)

OTHER PUBLICATIONS

International Search Report from International Application No. PCT/CN2020/127322 mailed Feb. 24, 2021.

*Primary Examiner* — Andrew Sniezek
(74) *Attorney, Agent, or Firm* — Shih IP Law Group, PLLC

(57) ABSTRACT

Disclosed in the present disclosure are a sound production apparatus and an electronic device. The sound production apparatus comprises a holder, a vibration unit, an elastic member, and a damping member, wherein the elastic member connects the holder and the vibration unit, and the damping member is disposed on the elastic member. The technical solution of the present disclosure aims at preventing the elastic member from resonating with the vibration unit, thereby ensuring the vibration trajectory of the vibration unit, and ensuring the operation stability of the sound production apparatus.

19 Claims, 9 Drawing Sheets

(51) Int. Cl.
*H04R 9/02* (2006.01)
*H04R 9/04* (2006.01)

(56) References Cited

FOREIGN PATENT DOCUMENTS

| | | | |
|---|---|---|---|
| CN | 206136268 | U | 4/2017 |
| CN | 206164837 | U | 5/2017 |
| CN | 108650598 | A | 10/2018 |
| CN | 208285531 | U | 12/2018 |
| CN | 110495188 | A | 11/2019 |
| CN | 110545509 | A | 12/2019 |
| CN | 110719554 | A | 1/2020 |
| CN | 212486775 | U | 2/2021 |
| JP | 2017112498 | A | 6/2017 |
| WO | 2017161473 | A1 | 9/2017 |

* cited by examiner

SOUND PRODUCTION APPARATUS AND ELECTRONIC DEVICE

TECHNICAL FIELD

The present disclosure relates to the technical field of electro-acoustic, and in particular, relates to a sound production apparatus and an electronic device.

BACKGROUND ART

As a transducer device that converts electrical signals into sound signals, a sound generation device is an important acoustic component in an electronic device. In current, with the continuous progress and innovation of technology, the structural design of conventional sound generation device is also constantly seeking for innovation and change. It is not only required to meet the development trend of thinning, but also it is required to pay attention to the optimization of performance, and in the meanwhile give consideration to the process simplification and cost control.

In the existing sound generation devices, elastic members are fixed on a voice coil bobbin to prevent the voice coil from polarizing in a non-vibration direction during vibration. However, since the elastic members vibrate as the voice coil vibrates, the normal vibration trajectory of the voice coil may be greatly affected when resonance occurs, thereby affecting the normal operation of the sound production apparatus.

SUMMARY

A main object of the present disclosure is to provide a sound production apparatus, aims at preventing the elastic member from resonating with the vibration unit, thereby ensuring the vibration trajectory of the vibration unit, and ensuring the operation stability of the sound production apparatus.

In order to achieve the above purpose, the present disclosure provides a sound production apparatus comprising a holder, a vibration unit, an elastic member, and a damping member, wherein the elastic member connects the holder and the vibration unit, and the damping member is provided on the elastic member.

In some embodiments of the present disclosure, the elastic member includes a first deformation area and a second deformation area, a deformation amount of the first deformation area is greater than a deformation amount of the second deformation area, and the damping member is provided at the first deformation area.

In some embodiments of the present disclosure, the damping member may be elastically deformable.

In some embodiments of the present disclosure, the elastic member includes:

- a first connecting portion connected with the vibration unit;
- a second connecting portion connected with the holder;
- a deformation portion having one side connected to the first connecting portion and the other side connected to the second connecting portion; and
- the damping member provided between the first connecting portion and the second connecting portion.

In some embodiments of the present disclosure, at least part of the elastic member is a wound wire-like structure, the wound wire-like structure has a plurality of continuous line segments, and the damping member connects at least two of the line segments; or,

- at least part of the elastic member is a deformable structure formed by punching a sheet-like structure, the elastic member has a plurality of continuous line segments, and the damping member connects at least two of the line segments.

In some embodiments of the present disclosure, the elastic member includes:

- a first connecting portion connected with the vibration unit;
- a second connecting portion connected with the holder;
- a deformation portion having one side connected to the first connecting portion and the other side connected to the second connecting portion, the first connecting portion is provided with at least two line segments, and the damping member connects the at least two line segments of the first connecting portion;
- and/or, a first connecting portion connected with the vibration unit;
- a second connecting portion connected with the holder;
- a deformation portion having one side connected to the first connecting portion and the other side connected to the second connecting portion, the second connecting portion is provided with at least two line segments, and the damping member connects the at least two line segments of the second connecting portion;
- and/or, a first connecting portion connected with the vibration unit;
- a second connecting portion connected with the holder;
- a deformation portion having one side connected to the first connecting portion and the other side connected to the second connecting portion, the deformation portion is provided with at least two line segments, and the damping member connects the at least two line segments of the deformation portion.

In some embodiments of the present disclosure, the deformation portion includes a first end connected with one of the first connecting portion and the second connecting portion, and a second end connected to the other one of the first connecting portion and the second connecting portion, and a central area is provided between the first end and the second end; and

- the first end extends to the central area in a straight line and/or a curve along a first direction to form a first deformation section;
- the first deformation section located in the central area extends to the second end in a straight line and/or a curve along a direction opposite to the first direction to form a second deformation section, and the first deformation section and the second deformation section are connected to form the deformation portion;
- the deformation portion is defined to have a long axis and a short axis that are perpendicular to each other, the first connecting portion and the second connecting portion are disposed spaced apart in a length direction of the short axis, and the damping member is positioned at the deformation portion and is disposed in a length direction of the long axis.

In some embodiments of the present disclosure, a plurality of damping members are provided, and the plurality of damping members are symmetrically disposed on both sides of the short axis in the length direction of the long axis.

In some embodiments of the present disclosure, a position where the first deformation section and the second deformation section are connected is defined as a center of the deformation portion, and the damping member is disposed at the center of the deformation portion.

In some embodiments of the present disclosure, a position where the first deformation section and the second deformation section are connected is defined as a center of the deformation portion, a plurality of damping members are provided, and the plurality of damping members are symmetrically disposed around the center of the deformation portion.

In some embodiments of the present disclosure, at least part of the first deformation section and at least part of the second deformation section are disposed adjacent to each other and form a deformation gap, and the damping member is filled in the deformation gap.

In some embodiments of the present disclosure, a first vibration gap is formed between the first connecting portion and the deformation portion, and the damping member is filled in the first vibration gap;

and/or, a second vibration gap is formed between the second connecting portion and the deformation portion, and the damping member is filled in the second vibration gap;

and/or, the deformation portion is a wound long strip structure, the deformation portion is provided with a third vibration gap, and the damping member is filled in the third vibration gap.

In some embodiments of the present disclosure, a plurality of damping members are provided, and the plurality of damping members are evenly distributed between the first connecting portion and the second connecting portion.

In some embodiments of the present disclosure, the elastic member has a deformation portion, the damping member is disposed on the deformation portion, the deformation portion is an axisymmetric structure having a symmetric line, and the damping member is positioned in an area corresponding to the symmetric line;

or, the elastic member is an axisymmetric structure having a symmetric line, and in the case where a plurality of damping members are provided, the plurality of damping members are symmetrically disposed on both sides of the symmetric line.

In some embodiments of the present disclosure, the plurality of line segments of the wound wire-like structure include a first line segment and a second line segment, a line diameter of the second line segment is larger than a line diameter of the first line segment, and the damping member connects the first line segment and the second line segment.

In some embodiments of the present disclosure, the second line segment is configured provided in a bending shape.

In some embodiments of the present disclosure, a plurality of first line segments and a plurality of second line segments are provided, the first line segments and the second line segments are configured to be alternately connected, and the damping member connects two of the first line segments adjacent to each other.

In some embodiments of the present disclosure, the material of the damping member comprises metal material, rubber material, silicone material, glue material or foam cotton material;

and/or, the damping member is provided in a bump-shape structure, a flat plate-shape structure or an arc-shape structure.

In some embodiments of the present disclosure, the material of the damping member includes a flexible material.

In some embodiments of the present disclosure, the vibration unit includes a diaphragm and a voice coil connected with the diaphragm, and the elastic member connects the voice coil and the holder;

or, the vibration unit includes a diaphragm, a voice coil and a cup, the voice coil and the cup are disposed on the same side of the diaphragm, and the elastic member connects the cup and the holder;

and/or, the holder is a housing or a magnetic yoke.

The present disclosure further provides an electronic device, the electronic device includes a sound production apparatus including a holder, a vibration unit, an elastic member, and a damping member, wherein the elastic member connects the holder and the vibration unit, and the damping member is disposed on the elastic member.

According to the present disclosure, the sound production apparatus is provided with a holder, a vibration unit, one side of an elastic member is connected to the vibration unit and the other side of an elastic member is connected to the holder, and a damping member is further provided on the elastic member. Since the elastic member is provided with the damping member thereon, a portion of the elastic member provided with the damping member and a portion of the elastic member which is not provided with the damping member require different energy for generating vibration of the same frequency. As such, the resonance frequency of the elastic member can be changed so as to reduce the probability of resonance of the elastic member. In this way, the technical solution of the present disclosure can prevent the elastic member from generating resonation with the vibration unit, thereby ensuring the vibration trajectory of the vibration unit, and ensuring the operation stability of the sound production apparatus.

BRIEF DESCRIPTION OF THE DRAWINGS

In order to explain the technical solutions in the embodiments of the present disclosure or in the prior art more clearly, the following will briefly introduce the accompanying drawings required for the description of the embodiments or the prior art. Obviously, the drawings in the following description are merely some embodiments of the present disclosure, and for those skilled in the art, other drawings can also be obtained according to the provided drawings without any creative effort.

REFERENCE SIGNS

Figure 1:
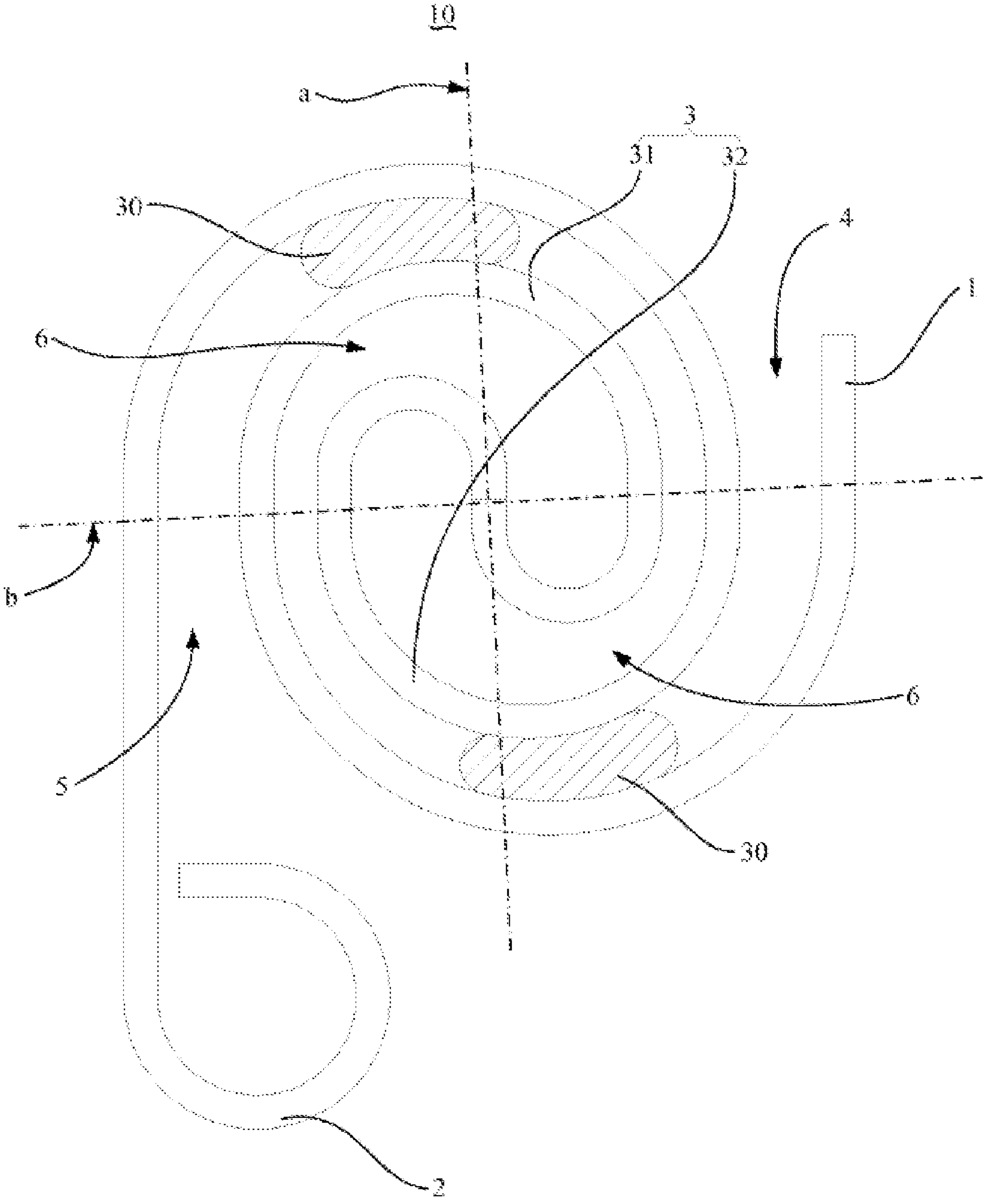
FIG. 1 is a structural schematic diagram of an elastic member of a sound production apparatus according to an embodiment of the present disclosure.
Figure 2:
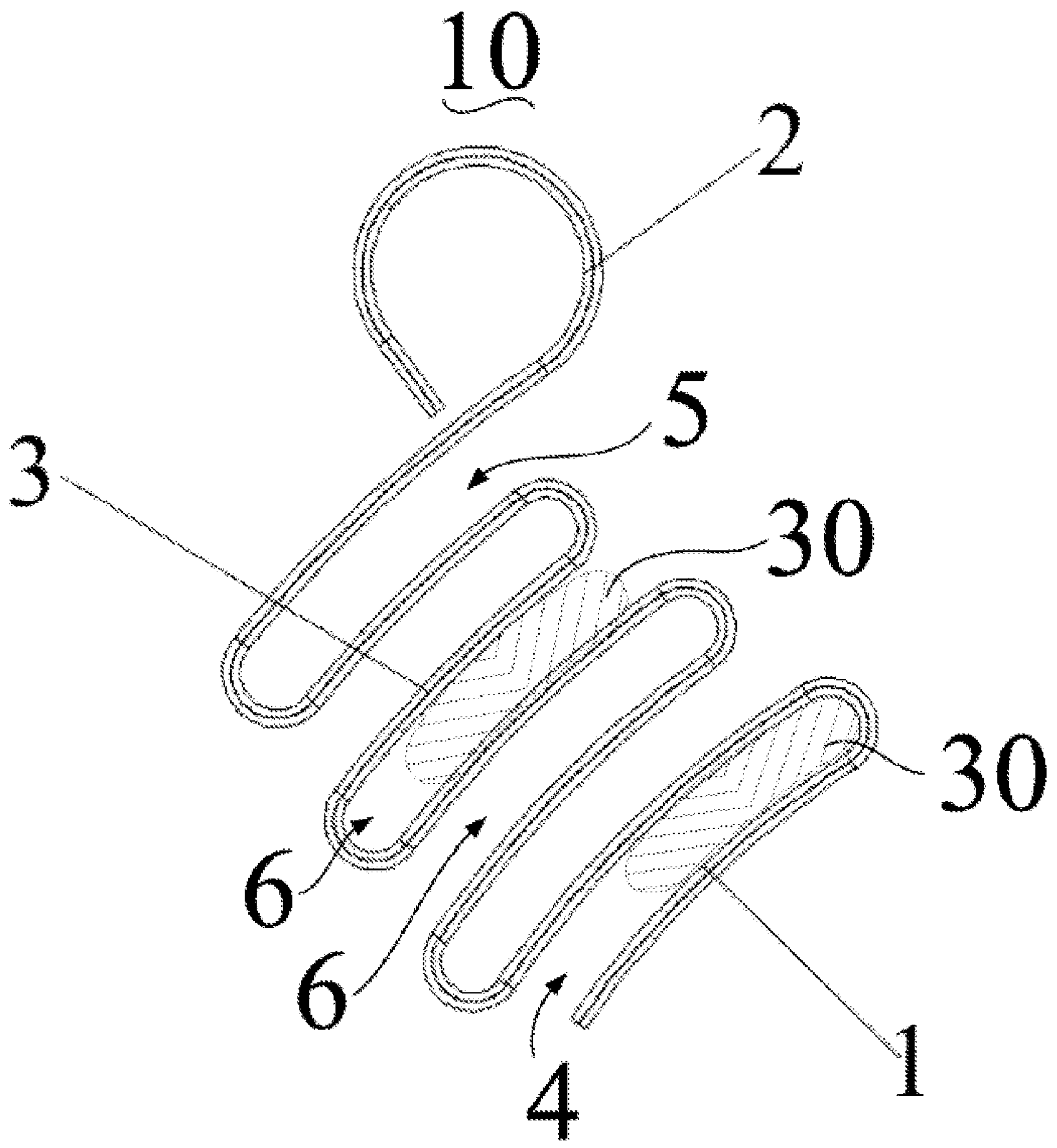
FIG. 2 is a structural schematic diagram of an elastic member of the sound production apparatus according to another embodiment of the present disclosure.

| Reference signs | Name | Reference signs | Name |
|---|---|---|---|
| 10 | elastic member | 30 | damping member |
| 1 | first connecting portion | a | long axis |
| 2 | second connecting portion | b | short axis |
| 3 | deformation portion | 40 | voice coil |
| 31 | first deformation section | 80 | holder |
| 32 | second deformation section | 90 | vibration unit |
| 4 | first vibration gap | 91 | diaphragm |
| 5 | second vibration gap | 92 | cup |
| 6 | third vibration gap | 100 | sound production apparatus |
| 7 | first line segment | 101 | magnetic circuit system |
| 8 | second line segment | 1011 | magnetic gap |

The realization, functional characteristics and advantages of the present disclosure will be further described with reference to the accompanying drawings in combination with the embodiments.

DETAILED DESCRIPTION OF THE EMBODIMENTS

The technical solutions in the embodiments of the present disclosure will be clearly and completely described below with reference to the drawings in the embodiments of the present disclosure. Obviously, the described embodiments are only part of the embodiments of the present disclosure, rather than all the embodiments. Based on the embodiments in the present disclosure, all other embodiments obtained by persons of ordinary skill in the art without creative efforts shall fall within the protection scope of the present disclosure.

It should be noted that all directional indications (such as up, down, left, right, front, back, etc.) in the embodiments of the present disclosure are only used to explain the relative position relationship, motion, etc. between components in a specific view position (as shown in the figure), and if the specific view position changes, the directional indication will change accordingly.

In addition, descriptions such as “first”, “second”, etc. in the present disclosure are only for descriptive purposes, and should not be construed as indicating or implying their relative importance or implicitly indicating the number of indicated technical features. Thus, features defined with “first” and “second” may explicitly or implicitly include at least one such feature. In addition, the technical solutions of various embodiments of the present disclosure can be combined with each other, but the combination must be based on the realization by those of ordinary skill in the art. When the combination of technical solutions is contradictory or impossible, it should be considered that the combination of such technical solutions does not exist, nor is it within the scope of protection claimed by the present disclosure.

In the present disclosure, unless otherwise expressly specified and limited, the terms “connected”, “fixed”, etc. should be understood in a broad sense. For example, “fixed” may refer to a fixed connection, a detachable connection, or may be integrated; may refer to a mechanical connection or an electrical connection; may be directly connected or indirectly connected through an intermediate medium; and it can be an internal communication between two elements or an interaction relationship between two elements, unless otherwise specified. For those of ordinary skill in the art, the specific meanings of the above terms in the present disclosure can be understood according to specific situations.

Referring to FIGS. 1 to 8, the present disclosure provides a sound production apparatus 100, the sound production apparatus 100 includes a holder 80, a vibration unit 90, an elastic member 10, and a damping member 30, wherein the elastic member 10 connects the holder 80 and the vibration unit 90, and the damping member 30 is disposed on the elastic member 10.

In an embodiment, the sound production apparatus 100 includes a vibration unit 90, a magnetic circuit system 101, and a housing for mounting and fixing the vibration unit 90 and the magnetic circuit system 101; wherein the vibration unit 90 includes a diaphragm 91 and a voice coil 40 coupled to the lower portion of the diaphragm 91; the magnetic circuit system 101 includes an upper magnetic conductive plate, a magnet and a lower magnetic conductive plate, wherein the upper magnetic conductive plate and the lower magnetic conductive plate are magnetic conductive structures for correcting magnetic lines of force generated by the magnet, the magnetic circuit system 101 forms a magnetic gap 1011, the voice coil 40 is disposed in the magnetic gap 1011 of the magnetic circuit system 101. The lower magnetic conductive plate of the present disclosure may be a U-shaped structure including a bottom wall and a side wall, the magnetic gap 1011 is formed between the upper magnetic conductive plate, the magnet and the side wall of the lower magnetic conductive plate, a relatively uniform magnetic field is formed in the magnetic gap 1011, and the voice coil 40 is disposed in the magnetic gap 1011 having a relatively uniform magnetic field. Generally, the voice coil 40 is formed by winding metal wires. When the voice coil 40 is powered on by an electrical signal, the voice coil 40 vibrates up and down under the action of the ampere force in the magnetic field. The vibration direction of voice coil 40 is indicated by vertical direction or up-down direction, and the direction perpendicular to the vibration of voice coil 40 is indicated by horizontal direction. Since the diaphragm 91 and the voice coil 40 are fixed and integrated by means of bonding and the like, the voice coil 40 will also drive the diaphragm 91 to vibrate when it vibrates up and down according to the electrical signal to generate sound waves.

However, since the magnetic field in the magnetic gap 1011 is relatively but not absolutely uniform, the position of the voice coil 40 may also change during the vibration of the voice coil 40, and the magnetic lines of force above an upper side of the magnetic gap 1011 are arc-shaped lines, thus the ampere force exerted on the voice coil 40 is not only in the vertical direction but also includes the ampere force in other directions, which causes the voice coil 40 to easily generate polarization in non-vertical direction during the vibration, which may further affect the vibration of the diaphragm 91.

In order to prevent the above-mentioned polarization, providing the elastic member 10 connecting the voice coil 40 and the holder 80 may perform the centering support to the polarization of the voice coil assembly 40, that is, ensure the voice coil assembly 40 to vibrate in the vibration direction in the magnetic gap 1011. In an embodiment, the elastic member 10 is a centering support sheet or a planar spring.

Figure 10:
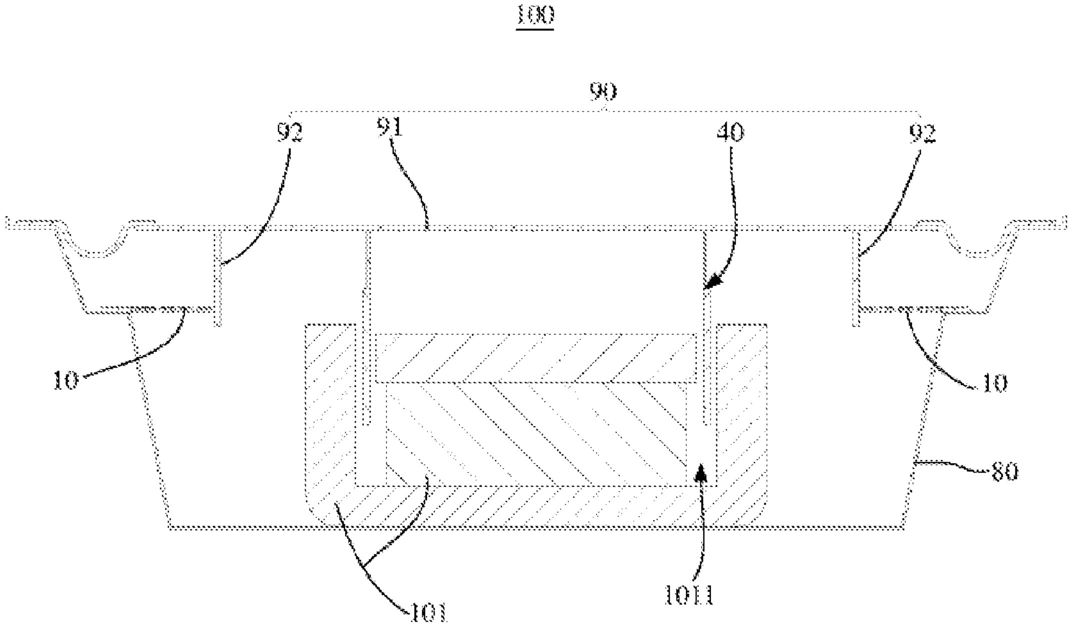
FIG. 10 is a structural schematic diagram of the sound production apparatus according to another embodiment of the present disclosure.

Referring to FIG. 10, in an embodiment, the vibration unit 90 further includes a cup 92 disposed on the diaphragm 91, the cup 92 and the voice coil 30 are disposed on the same side of the diaphragm 91 and the cup 92 is disposed around the voice coil 40; when the magnetic gap 1011 is provided, the cup 92 is positioned outside the magnetic gap 1011, and providing the elastic member 10 connecting the cup 92 and the holder 80 may also perform the centering support to the polarization of the voice coil, that is, ensure that the voice coil 40 vibrates in the vibration direction within the magnetic gap 1011.

In an embodiment, the holder 80 is a housing or a magnetic yoke. Since the housing may be used to support the loudspeaker unit, configuring the holder 80 as a housing can facilitate to fix a side of the elastic member 10 away from the vibration unit 90 and improve the centering support effect of the elastic member 10. Since most portions of the vibration unit 90 are close to the magnetic gap 1011, the vibration unit 90 is close to the magnetic yoke, therefore connecting the side of the elastic member 10 away from the vibration unit 90 to the magnetic yoke can reduce the distance for arranging the elastic member 10, and on the other hand, it can improve the centering support effect of the elastic member 10. It should be noted that, in the embodiment, the fixing methods of the elastic member 10 comprise various combinations, that is, the elastic member 10 connects the voice coil 40 and the housing, the elastic member 10 connects the voice coil 40 and the magnetic yoke, the elastic member 10 connects the cup 92 and the housing, and the elastic member 10 connects the cup 92 and the magnetic yoke, all of which can well ensure the centering support effect of the elastic member 10.

According to the present disclosure, the sound production apparatus 100 is provided with a holder 80 and a vibration unit 90, one side of the elastic member 10 is connected to the vibration unit 90 and the other side of the elastic member 10 is connected to the holder 80, and a damping member 30 is further provided on the elastic member 10. Since the elastic member 10 is provided with the damping member 30 thereon, a portion of the elastic member 10 provided with the damping component 30 and a portion of the elastic member 10 which is not provided with the damping component 30 require different energy for generating vibration of the same frequency. As such, the resonance frequency of the elastic member 10 can be changed so as to reduce the probability of resonance of the elastic member 10. In this way, the technical solution of the present disclosure can prevent the elastic member 10 from resonating with the vibration unit 90, thereby ensuring the vibration trajectory of the vibration unit 90, and ensuring the operation stability of the sound production apparatus 100.

In some embodiments of the present disclosure, the elastic member 10 includes a first deformation area and a second deformation area, a deformation amount of the first deformation area is greater than a deformation amount of the second deformation area, and the damping member 30 is disposed at the first deformation area. In the embodiment, since a part of the elastic member 10 has a large amount of elastic deformation, the vibration energy required for this part is low, so that this part of the elastic member 10 is easy to resonate with the vibration unit 90 and thereby affect the vibration trajectory of the vibration unit 90, thus disposing the damping member 30 at the first deformation area can increase the energy required to vibrate in the first deformation area, accordingly, the resonance frequency of the elastic member 10 can be changed and the probability of resonance of the elastic member 10 can be reduced. It will be understood that the first deformation area and the second deformation area may be connected to each other or spaced apart from each other, and the elastic member 10 may have a plurality of first deformation areas and a plurality of second deformation areas. In addition, different amounts of elastic deformation may be defined according to different vibration units 90 a prat of the vibration units 90 have high resonance frequencies and a part of the vibration units 90 have low resonance frequencies. When the elastic deformation in the deformation area is greater than the defined amount of elastic deformation, such a deformation area is identified as the first deformation area. In an embodiment, when the elastic member 10 includes a first connecting portion 1 for connecting with the vibration unit 90, a second connecting portion 2 for connecting with the holder 80, and a deformation portion 3 for connecting the first connecting portion 1 and the second connecting portion 2, the first deformation area can be regarded as the deformation portion 3, and the second deformation area can be regarded as the first connecting portion 1 and the second connecting portion 2.

In some embodiments of the present disclosure, the damping member 30 may be elastically deformed. As such, the damping member 30 may improve the deformation degree of the region in which the damping member 30 is disposed, so as to improve the overall elasticity of the elastic member 10, thereby changing the resonance frequency of the elastic member 10.

Referring to FIGS. 1-8, in some embodiments of the present disclosure, the elastic member 10 includes: a first connecting portion 1 connected with the vibration unit 90; a second connecting portion 2 connected with the holder 80; a deformation portion 3 having one side connected to the first connecting portion 1 and the other side connected to the second connecting portion 2; and a damping member 30 provided between the first connecting portion 1 and the second connecting portion 2.

The elastic member 10 is connected with the vibration unit 90 through the first connecting portion 1 thereof. In addition, the elastic member 10 constrains the reciprocating vibration of the vibration unit 90 by the elastic deformation of the deformation portion 3 thereof according to the vibration offset state of the vibration unit 90, so that the vibration unit 90 is stabilized in a predetermined central area, the polarization of the vibration unit 90 is prevented so that the reciprocating vibration of the vibration unit 90 is more stable. In an embodiment, the elastic member 10 can have both the functions of conducting electricity and centering, and can realize the functions of electrical conducting the internal and external circuits and performing the centering to the vibration of the vibration unit 90 at the same time, which can not only reduce space inside the cavity of the sound production apparatus 100, but also effectively simplify the assembly process of the sound production apparatus 100. Further, by providing the damping member 30 between the first connecting portion 1 and the second connecting portion 2, the resonance frequency of a part of the locations between the first connecting portion 1 and the second connecting portion 2 is changed, thereby changing the resonance frequency of the elastic member 10 and reducing the probability of resonance of the elastic member 10, therefore it can prevent the resonance of elastic member 10, ensure the vibration trajectory of the vibration unit 90, and ensure the operation stability of the sound production apparatus 100.

In an embodiment, the elastic member 10 may be made of a non-magnetic conductive material, generally a non-ferrous metal, and specifically may be made of at least one of phosphor bronze, iron, steel or alloy materials, such materials are not susceptible to environmental changes, not easy to deform under high temperature and high humidity environment, and the hardness may not be changed, the fatigue resistance is good, so that the sound production apparatus 100 is capable of operating in harsh environments, therefore, the product performance can be optimized and the application range of the sound production apparatus 100 can be increased.

Referring to FIGS. 1-2 and 6-7, in some embodiments of the present disclosure, the damping member 30 has one side connected to the first connecting portion 1 and the other side connected to the deformation portion 3. This configuration changes the vibration frequency of the part of the elastic member 10, which is relatively close to the vibration unit 90, with respect to other parts of the elastic member 10 during the vibration, so as to avoid the resonance of the elastic member 10. The damping member 30 may be bonded and fixed to the elastic member 10 by a bonding member, in particular, glue may be used for bonding. Alternatively, a clamping means may be provided on the first connecting portion 1 and the deformation portion 3, and a clamping structure may be provided on the damping member 30, so that one side of the damping member 30 is connected to the first connecting portion 1 and the other side of the damping member 30 is connected to the deformation portion 3 by fitting the clamping means with the clamping structure.

Figure 3:
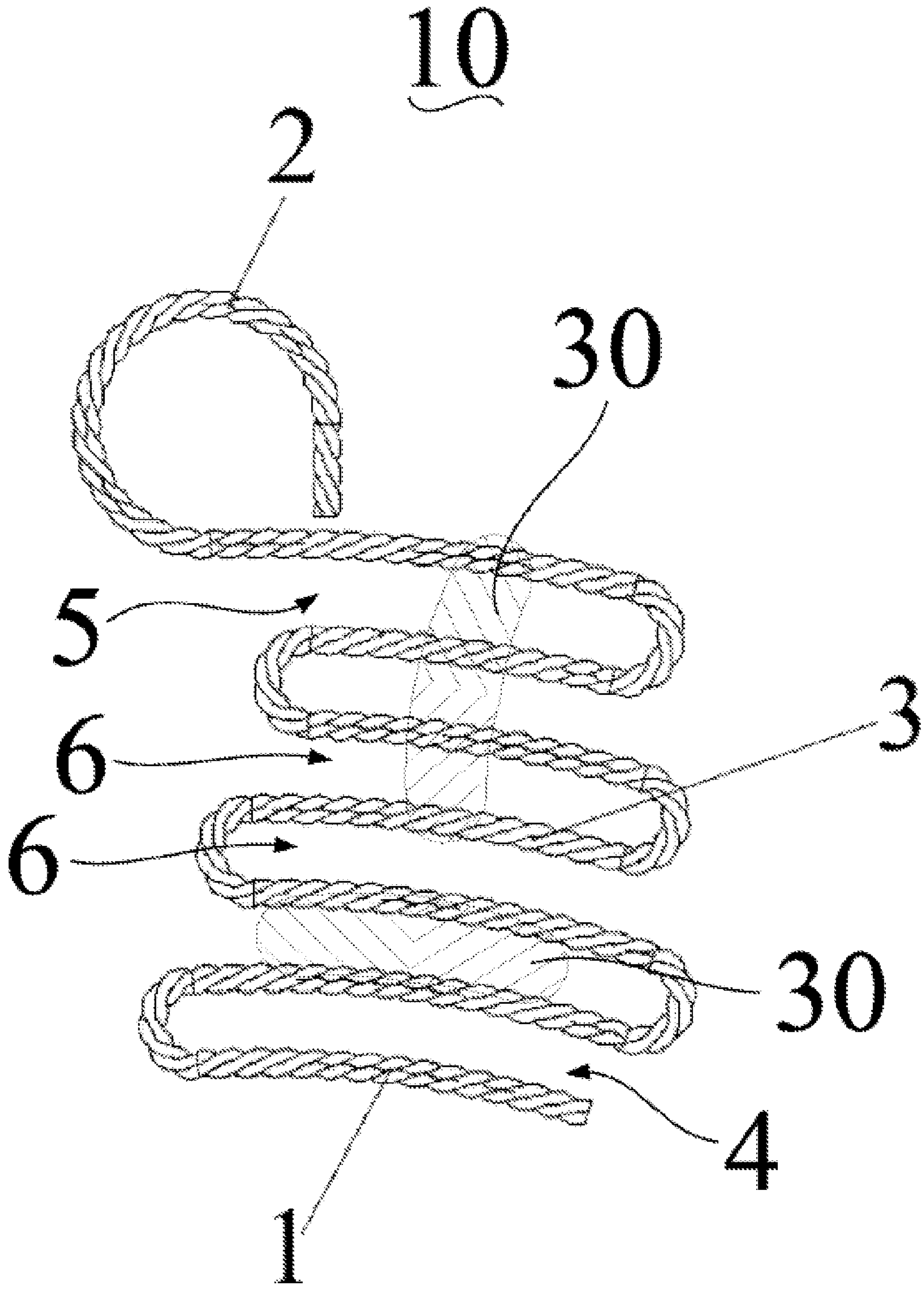
FIG. 3 is a structural schematic diagram of an elastic member of the sound production apparatus according to still another embodiment of the present disclosure.
Figure 4:
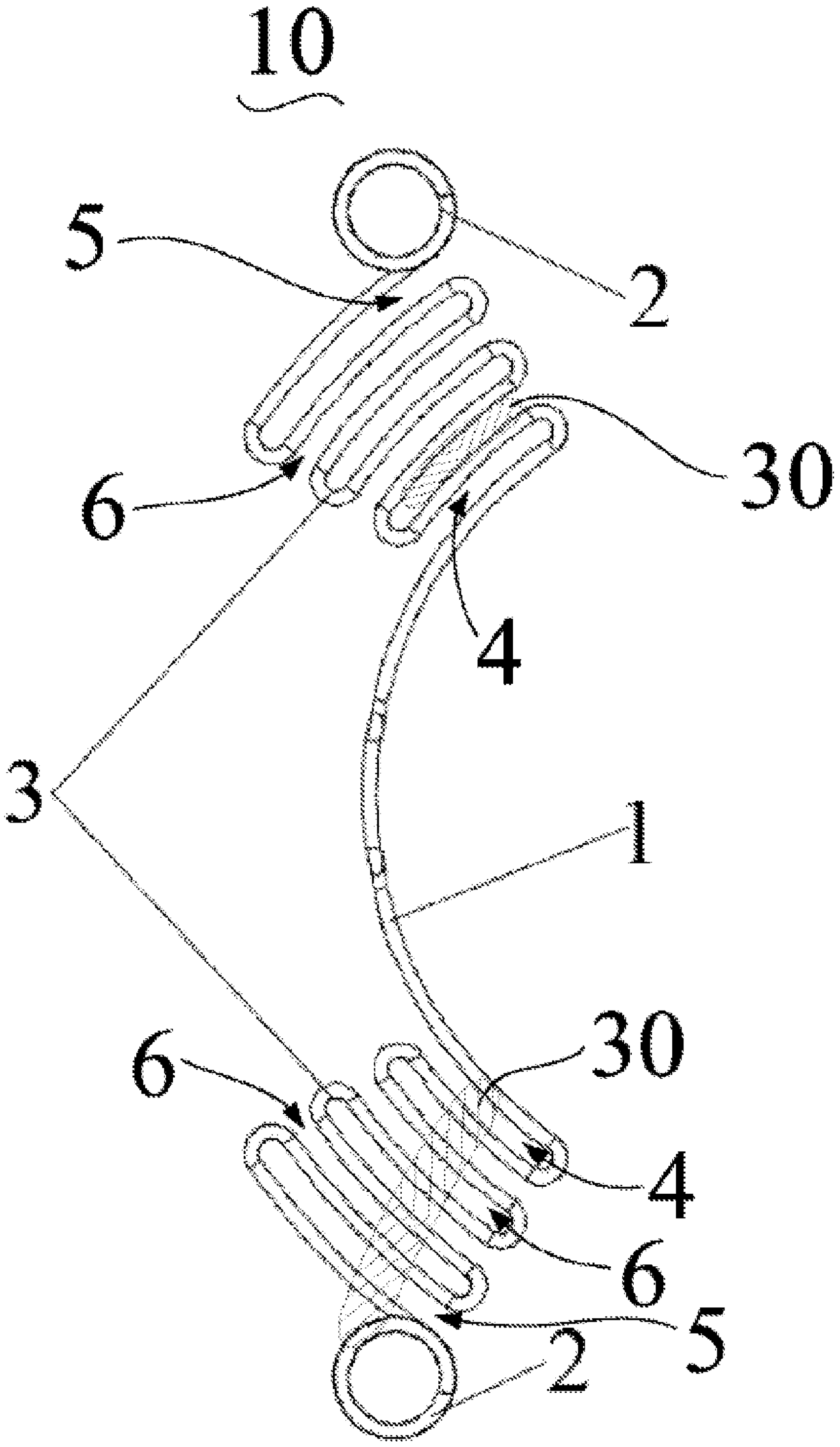
FIG. 4 is a structural schematic diagram of an elastic member of the sound production apparatus according to yet another embodiment of the present disclosure.
Figure 5:
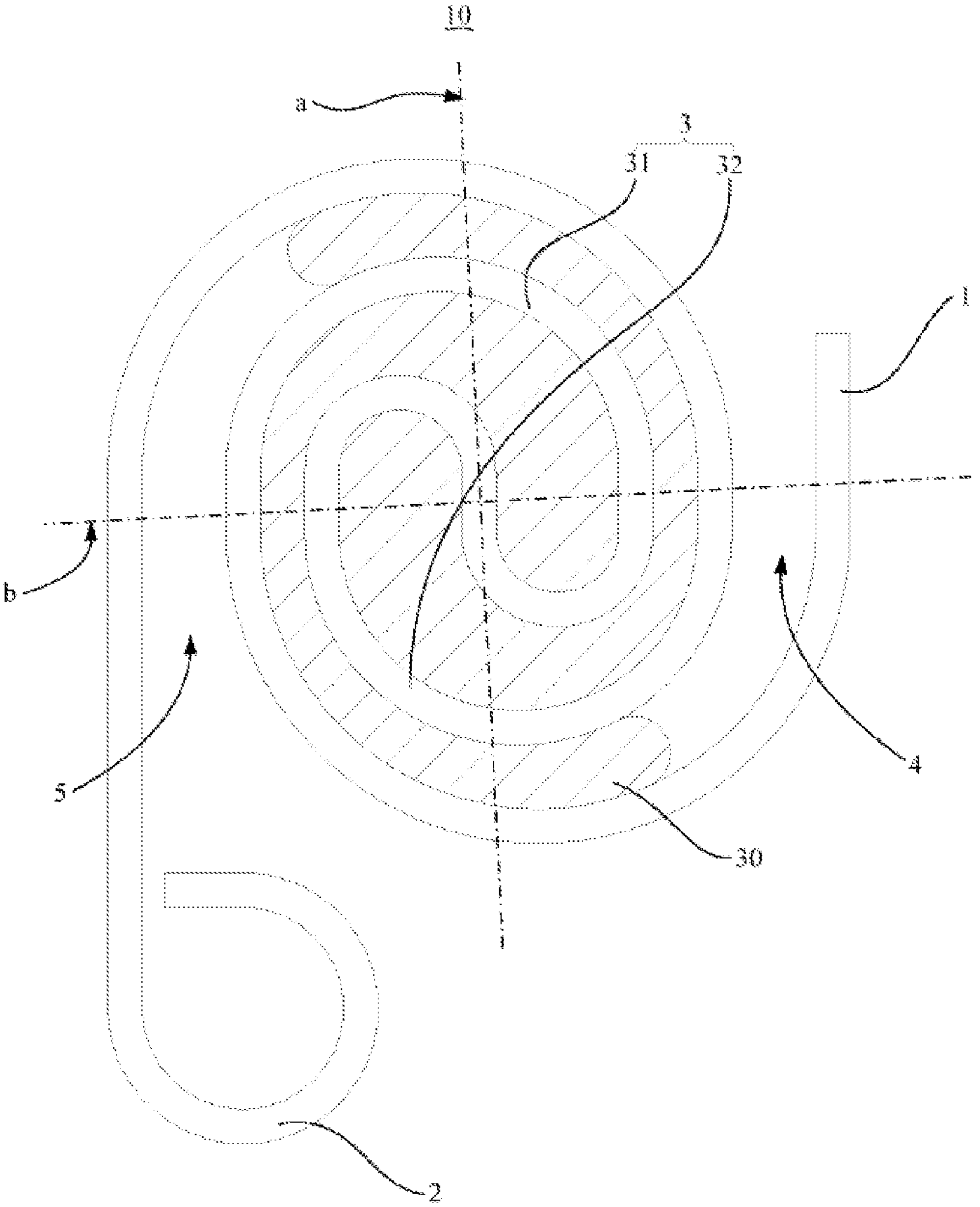
FIG. 5 is a structural schematic diagram of an elastic member of the sound production apparatus according to further another embodiment of the present disclosure.
Figure 6:
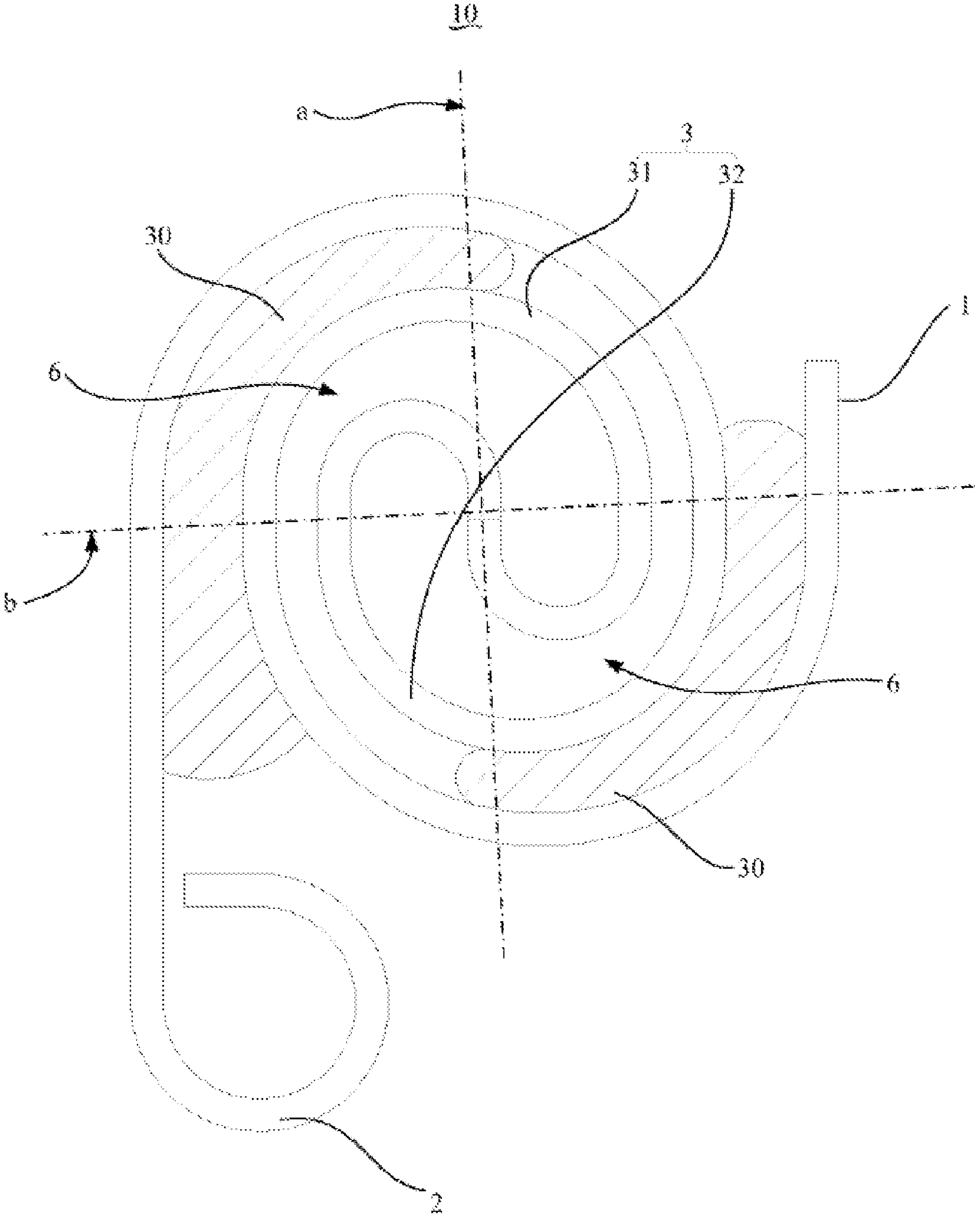
FIG. 6 is a structural schematic diagram of an elastic member of the sound production apparatus according to furthermore another embodiment of the present disclosure.
Figure 7:
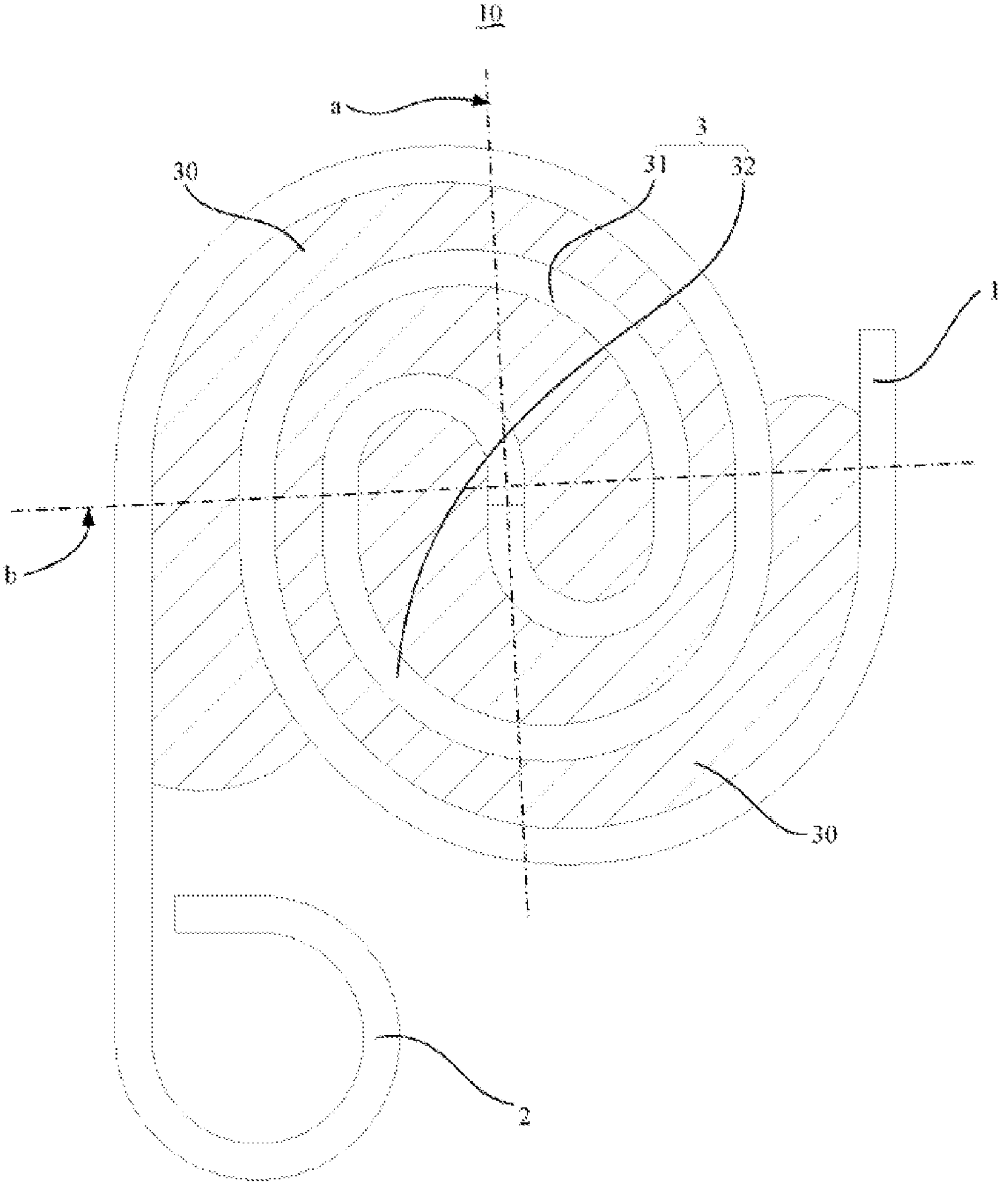
FIG. 7 is a structural schematic diagram of an elastic member of the sound production apparatus according to one more another embodiment of the present disclosure.

Referring to FIGS. 1 and 3-4, in some embodiments of the present disclosure, one side of the damping member 30 is connected with the second connecting portion 2, and the other side of the damping member 30 is connected with the deformation portion 3. This configuration changes the vibration frequency of the part of the elastic member 10, which is relatively far away from the vibration unit 90, with respect to other parts of the elastic member 10 during the vibration, so as to avoid the resonance of the elastic member 10. The damping member 30 may be bonded and fixed to the elastic member 10 by a bonding member, in particular, glue may be used for bonding. Alternatively, a clamping means may be provided on the second connecting portion 2 and the deformation portion 3 and a clamping structure may be provided on the damping member 30, so that one side of the damping member 30 is connected to the second connecting portion 2 and the other side of the damping member 30 is connected to the deformation portion 3 by fitting the clamping means with the clamping structure.

Referring to FIG. 4, in some embodiments of the present disclosure, one side of the damping member 30 is connected with the first connecting portion 1, and the other side of the damping member 30 is connected to the second connecting portion 2. This configuration changes the vibration frequency of both sides of the elastic member 10 for fixing, with respect to a central portion for connecting during the vibration, so as to avoid the resonance of the elastic member 10. The damping member 30 may be bonded to the elastic member 10 through a bonding member, in particular, glue may be used for bonding. Alternatively, a clamping means may be provided on the first connecting portion 1 and the second connecting portion 2 and a clamping structure may be provided on the damping member 30, so that one side of the damping member 30 is connected to the first connecting portion 1 and the other side of the damping member 30 is connected to the second connecting portion 2 by fitting the clamping means with the clamping structure.

Referring to FIG. 4, in some embodiments of the present disclosure, one side of the damping member 30 is connected to the first connecting portion 1, the other side of the damping member 30 is connected to the second connecting portion 2, and a central portion of the damping member 30 is connected to the deformation portion 3. In this way, the portions of the first connecting portion 1, the second connecting portion 2 and the deformation portion 3 where the damping member 30 is provided to have an elastic deformation and a mass different from that of the portions of the first connecting portion 1, the second connecting portion 2 and the deformation portion 3 where no damping member 30 is provided, so that the energy required to generate vibration of the same frequency are different, as such, the resonance frequency of the elastic member 10 can be changed, and the probability of resonance of the elastic member 10 can be reduced.

In some embodiments of the present disclosure, the damping member 30 is disposed on the first connecting portion 1, or the damping member 30 is disposed on the second connecting portion 2, or the damping member 30 is disposed on the deformation portion 3. In this way, a portion of the elastic member 10 where the damping member 30 is provided and a portion of the elastic member 10 where no damping member 30 is provided require different energy for generating vibration of the same frequency. As such, the resonance frequency of the elastic member 10 can be changed so as to reduce the probability of resonance of the elastic member 10.

In some embodiments of the present disclosure, at least part of the elastic member 10 is a wound wire-like structure, the wound wire-like structure has a plurality of continuous line segments, and the damping member 30 connects at least two of the line segments. The elastic member 10 of the present embodiment has a wire-like bending structure, it is easy to prepare and can provide good compliance when the vibration displacement of the vibration unit 90 is large.

In some embodiments of the present disclosure, at least part of the elastic member 10 is a deformable structure formed by punching a sheet-like structure, the elastic member 10 has a plurality of continuous line segments, and the damping member 30 connects at least two of the line segments. After forming by punching, the cross section of the elastic member 10 in the present embodiment is in a shape such as a square or a rectangle, and may also be in other flat shapes. The method of forming by punching enables the elastic member 10 to be an integral structure, and is convenient to manufacture so that the production efficiency is improved. Further, the deformation portion 3 of the elastic member 10 is a planar structure, and the deformation portion 3 is located in the same horizontal plane as the first connecting portion 1 and the second connecting portion 2, so that the elastic member 10 has a planar structure as a whole. Compared with the existing sheet-shaped wavy type elastic member 10, the present embodiment improves the overall flatness of the elastic member 10, further reduces the height of the sound production apparatus 100 in the vertical direction, and realizes the design concept of thin products.

It should be noted that the line segments in the present embodiment may be distinguished according to the bending direction. For example, the wound wire-like structure has a straight line segment and a curved line segment, it can be considered that the straight line segment is a piece of line segment, the curved line segment is a piece of line segment, and in a curved line segment, a line segment that bends in clockwise is a piece of line segment, a segment that bends in counterclockwise is a piece of line segment, and a straight line segment extending in one direction is a piece of line segment, a straight line segment extending in another direction is a piece of line segment. The damping member 30 connects at least two of the line segments, which improves the strength of the elastic member 10, and on the other hand, allows the line segments of the elastic member 10 where the damping member 30 is provided to have an elastic deformation and a mass different from that of the line segments of the elastic member 10 where no damping member 30 is provided, so that the energy required to generate vibration of the same frequency are different, and as such, the resonance frequency of the elastic member 10 can be changed, and the probability of resonance of the elastic member 10 can be reduced.

In some embodiments of the present disclosure, the first connecting portion 1 is provided with at least two line segments, and the damping member 30 connects the at least two line segments of the first connecting portion 1, this configuration improves the strength of the first connecting portion 1, and on the other hand, allows the energy required by the first connecting portion 1 to be different from the energy required by the second connecting portion 2 and the deformation portion 3 to generate vibration of the same frequency, and as such, the resonance frequency of the elastic member 10 can be changed, and the probability of resonance of the elastic member 10 can be reduced.

In some embodiments of the present disclosure, the second connecting portion 2 is provided with at least two line segments, and the damping member 30 connects the at least two line segments of the second connecting portion 2, this configuration improves the strength of the second connecting portion 2, and on the other hand, allows the energy required by the second connecting portion 2 of the elastic member 10 to be different from that the energy required by the first connecting portion 1 and the deformation portion 3 to generate vibration of the same frequency, and as such, the resonance frequency of the elastic member 10 can be changed so as to reduce the probability of resonance of the elastic member 10.

In some embodiments of the present disclosure, the deformation portion 3 is provided with at least two line segments, and the damping member 30 connects the at least two line segments of the deformation portion 3, this configuration improves the strength of the deformation portion 3, and on the other hand, allows the energy required by deformation portion 3 of the elastic member 10 to be different from that the energy required by the first connecting portion 1 and the second connecting portion 2 to generate vibration of the same frequency, and as such, the resonance frequency of the elastic member 10 can be changed so as to reduce the probability of resonance of the elastic member 10. When it is necessary to fix the damping member 30 to the line segment, the damping member 30 can be fixed by gluing or be clamped by two line segments as long as it is convenient for fixing.

Referring to FIGS. 1 and 5-7, the deformation portion 3 includes a first end connected to one of the first connecting portion 1 and the second connecting portion 2, and a second end connected to the other one of the first connecting portion 1 and the second connecting portion 2, and a central area is provided between the first end and the second end; the first end extends to the central area in a straight line and/or a curve along a first direction to form a first deformation section 31; the first deformation section 31 located in the central area extends to the second end in a straight line and/or a curve along a direction opposite to the first direction to form a second deformation section 32, and the first deformation section 31 and the second deformation section 32 are combined to form the deformation portion 3; the deformation portion 3 has a long axis "a" and a short axis "b" that are perpendicular to each other, the first connecting portion 1 and the second connecting portion 2 are configured spaced apart in a length direction of the short axis b, and the damping member 30 is disposed at the deformation portion 3 in a length direction of the long axis a.

As such, both of the first deformation section 31 and the second deformation section 32 have long lengths on the premise that the deformation portion 3 occupies a small space, thereby obtaining a better elastic deformation. In the embodiment, the deformation portion 3 of the elastic connector may be a planar structure, and the deformation portion 3 is located in the same horizontal plane as the first connecting portion 1 and the second connecting portion 2, so that the elastic connector has a planar structure as a whole. Compared with the existing sheet-shaped wavy type elastic connector, it will be understood that the first end and the second end may be connected with any one of the first connecting portion 1 and the second connecting portion 2, as long as it is convenient for the winding and the production efficiency and good quality can be ensured. The embodiment improves the overall flatness of the elastic connector, further reduces the height of the sound production apparatus 100 in the vertical direction, and realizes the design concept of thinning the products.

The first direction may be a clockwise direction, and the deformation portion 3 may have a polygonal spiral structure, specifically structures of quadrilateral, pentagon, hexagon, etc., or structures of circular, elliptical. Alternatively, the deformation portion 3 may have a structure in which a straight line shape is combined with a curve shape, for example, a part of the first deformation section 31 is a straight line, and the other part thereof is an arc line, specifically, the first deformation section 5 may have a shape in which an arc line and a straight line are alternately combined. It should be noted that the "alternate" herein is not limited to the case where one object alternates with one object, but may also be the case where one object alternates with many objects and the case where many objects alternate with many objects.

In the embodiment, the deformation portion 3 is configured in a substantially elliptical shape, the deformation portion 3 has a long axis a and a short axis b that are perpendicular to each other, the first connecting portion 1 and the second connecting portion 2 are configured spaced apart in a length direction of the short axis b, such that a distance between the first connecting portion 1 and the second connecting portion 2 is shorter than a length of the deformation portion 3. Under the same configuration, the shorter structure has stronger structural stability than that of a longer structure, thus the combining stability of the elastic member 10 with the vibration unit 90 and the holder 80 can be ensured. At this time, since the long axis a is long, the energy required to generate vibration is low, the long axis a of the elastic member 10 in the present embodiment may vibrate in a direction of the short axis b. Accordingly, a damping member 30 is provided at the long axis a to improve the energy required by the long axis a to generate vibration, and as such, the resonance frequency of the elastic member 10 can be changed so as to reduce the probability of resonance of the elastic member 10.

It will be understood that in the embodiment, one of the first deformation section 31 and the second deformation section 32 may extend in a clockwise direction and the other one may extend in a counterclockwise direction, so that both of them can well form a uniform elastic member 10, so as to ensure the stability of the vibration of the vibration unit 90.

In some embodiments of the present disclosure, a position where the first deformation section 31 and the second deformation section 32 are connected is defined as a center of the deformation portion 3, and the damping member 30 is disposed at the center of the deformation portion 3. It should be noted that in the embodiment, the first deformation section 31 and the second deformation section 32 extend in different directions (one of them extends in a clockwise direction and the other one extends in a counter-clockwise direction) and then are connected to each other to form a uniform deformation portion 3. It may be understood that the first deformation section 31 and the second deformation section 32 are arranged symmetrically around the center, therefore a position where they are connected can be understood as the center of the deformation portion 3. The damping member 30 is disposed at the center of the deformation portion 3 to change the mass of the center of the elastic member 10, so that the energy required by the portion of the elastic member 10 where the damping member 30 is provided is different from that of the portion of the elastic member 10 where no damping member 30 is provided to generate vibration of the same frequency are different between a portion. As such, the resonance frequency of the elastic member 10 can be changed so as to reduce the probability of resonance of the elastic member 10.

In some embodiments of the present disclosure, a position where the first deformation section 31 and the second deformation section 32 are connected is defined as a center of the deformation portion 3, a plurality of damping members 30 are provided, and the plurality of damping members 30 are symmetrically disposed around the center of the deformation portion 3. In the embodiment, a plurality of damping members 30 are provided symmetrically around the center of the deformation portion 3, so that the mass of the elastic member 10 is changed at a plurality of positions, and thereby the portion of the elastic member 10 where the damping member 30 is provided and the portion of the elastic member 10 where no damping member 30 is provided require different energy for generating vibration of the same frequency. As such, the resonance frequency of the elastic member 10 can be changed, so as to reduce the probability of resonance of the elastic member 10.

In some embodiments of the present disclosure, at least part of the first deformation section 31 and at least part of the second deformation section 32 are disposed adjacent to each other and form a deformation gap, and the damping member 30 is filled in the deformation gap. In the present embodiment, the damping member 30 is disposed in the deformation gap, this configuration can change the elastic deformation degree of the first deformation section 31 and the second deformation section 32 that are close to each other, and on the other hand, the mass is changed at the deformation portion 3, so that the portion of the elastic member 10 where the damping member 30 is provided and the portion of the elastic member 10 where no damping member 30 is provided require different energy for generating vibration of the same frequency. As such, the resonance frequency of the elastic member 10 can be changed, so as to reduce the probability of resonance of the elastic member 10.

Figure 9:
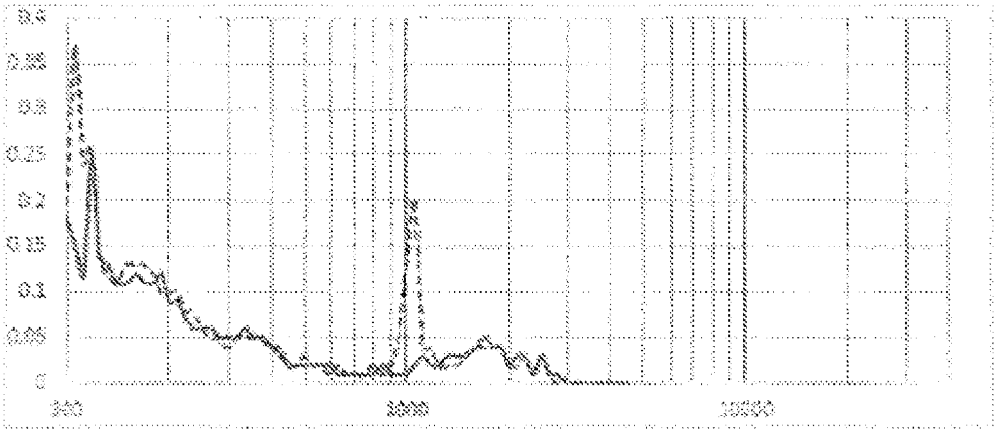
FIG. 9 is a HOHD (high-order harmonic distortion) graph in the case where the sound production apparatus is not provided with a damping member and the sound production apparatus is provided with a damping member according to the present disclosure.

Referring to FIG. 9, the FIG. 9 is a distortion curve diagram of the elastic member 10, specifically a high-order harmonic distortion curve diagram, wherein the dotted line shows the distortion curve before the damping member 30 is provided, and a resonance occurs at 1000 HZ; the solid line shows the distortion curve after the damping member 30 is provided, and the resonance substantially disappears.

In some embodiments of the present disclosure, a plurality of damping members 30 are provided, and the plurality of damping members 30 are symmetrically arranged on both sides of the short axis b along the length direction of the long axis a. According to the aforementioned vibration form of the elastic member 10 in which the deformation portion 3 is configured in an elliptical shape, disposing a plurality of damping members 30 in the length direction of the long axis a can improve the strength of the elastic member 10 at a plurality of positions, and on the other hand, allows the energy required by the elastic member 10 to generate vibration of the same frequency to be different at a plurality of positions. As such, the resonance frequency of the elastic member 10 can be further changed, and the probability of resonance of the elastic member 10 can be greatly reduced. Symmetrical arrangement can well form a uniform elastic member 10 and ensure the stability of the vibration of the vibration unit 90.

Referring to FIGS. 1-4, in some embodiments of the present disclosure, a first vibration gap 4 is formed between the first connecting portion 1 and the deformation portion 3, and the damping member 30 is filled in the first vibration gap 4. In the embodiment, the elastic member 10 may be a wire-like structure formed by winding a single-stranded metal wire, or a wire-like structure formed by combining at least two-stranded metal wires in parallel and side by side into an integral and then winding, or a wire-like structure formed by intertwining at least two-stranded metal wires with each other into an integral and then winding, or a structure formed by punching, therefore a first vibration gap 4 is formed between the first connecting portion 1 and the deformation portion 3, and the damping member 30 is provided to fill in the first vibration gap 4, so that at least part (or all) of the first connecting portion 1 and the deformation portion 3 are connected, this configuration increases the structural strength of the first connecting portion 1 and the deformation portion 3, and on the other hand, allows the energy required by the part where the first connecting portion 1 and the deformation portion 3 are combined to generate vibration to be different from that of the second connecting portion 2 (and the part where the first connecting portion 1 and the deformation portion 3 are not combined). As such, the resonance frequency of the elastic member 10 can be changed so as to reduce the probability of resonance of the elastic member 10. For filling the first gap with a spacer, glue may be used to perform the fixing, or the spacer may be directly fixed by means of interference fitting, abutting or snapping.

In some embodiments of the present disclosure, a second vibration gap 5 is formed between the second connecting portion 2 and the deformation portion 3, and the damping member 30 is filled in the second vibration gap 5. In the embodiment, the elastic member 10 may be a wire-like structure formed by winding a single-stranded metal wire, or a wire-like structure formed by combining at least two-stranded metal wires in parallel and side by side into an integral and then winding, or a wire-like structure formed by intertwining at least two-stranded metal wires with each other into an integral and then winding, or a structure formed by punching, therefore a second vibration gap 5 is formed between the second connecting portion 2 and the deformation portion 3, and the damping member 30 is provided to fill in the second vibration gap 5, so that at least part (or all) of the second connecting portion 2 and the deformation portion 3 are connected, this configuration increases the structural strength of the second connecting portion 2 and the deformation portion 3, and on the other hand, allows the energy required by the part where the first connecting portion 1 and the deformation portion 3 are combined to generate vibration to be different from that of the second connecting portion 2 (and the part where the second connecting portion 2 and the deformation portion 3 are not combined). As such, the resonance frequency of the elastic member 10 can be changed so as to reduce the probability of resonance of the elastic member 10. For filling the second gap with a spacer, glue may be used to perform the fixing, or the spacer may be directly fixed by means of interference fitting, abutting or snapping.

In some embodiments of the present disclosure, the deformation portion 3 is a wound long strip structure, the deformation portion 3 is provided with a third vibration gap 6, and the damping member 30 is filled in the third vibration gap 6. In the embodiment, the elastic member 10 may be a wire-like structure formed by winding a single-stranded metal wire, or a wire-like structure formed by combining at least two-stranded metal wires in parallel and side by side into an integral and then winding, or a wire-like structure formed by intertwining at least two-stranded metal wires with each other into an integral and then winding, or a structure formed by punching, therefore a third vibration gap 6 is provided between the deformation portion 3, and the damping member 30 is filled in the third vibration gap 6, so that at least part (or all) of the deformation portion 3 are connected, this configuration increases the structural strength of the deformation portion 3, and on the other hand, allows the energy required by the part where the deformation portion 3 are connected to generate vibration to be different from that of the part where the deformation portion 3 are not connected, the first connecting portion 1 and the second connecting portion 2. As such, the resonance frequency of the elastic member 10 can be changed so as to reduce the probability of resonance of the elastic member 10. For filling the third gap with a spacer, glue may be used to perform the fixing, or the spacer may be directly fixed by means of interference fitting, abutting or snapping.

In some embodiments of the present disclosure, a plurality of damping members 30 are provided, and the plurality of damping members 30 are evenly distributed between the first connecting portion 1 and the second connecting portion 2. It will be understood that, the plurality of damping members 30 may be distributed on at least one of the first connecting portion 1, the second connecting portion 2 and the deformation portion 3, and the specific number and distribution type thereof can be determined according to shape of the elastic member 10 or the shape of the vibration unit 90 or the shape of the holder 80. The arrangement of the plurality of damping members 30 can increase the strength of the elastic member 10 at a plurality of positions, and on the other hand, allows the energy required by the elastic member 10 to generate vibration of the same frequency are different at a plurality of positions. As such, furthermore, the resonance frequency of the elastic member 10 can be changed, and the probability of resonance of the elastic member 10 can be greatly reduced.

In some embodiments of the present disclosure, the elastic member 10 has a deformation portion 3, the damping member 30 is disposed on the deformation portion 3, the deformation portion 3 is an axisymmetric structure with a symmetric line, and the damping member 30 is located in an area corresponding to the symmetric line; alternatively, in the case where a plurality of damping members 30 are provided, the plurality of damping members 30 are symmetrically arranged on both sides of the symmetric line. This configuration can improve the strength at the deformation portions 3 of the elastic member 10, and on the other hand, allows the energy required by the elastic member 10 to generate vibration of the same frequency to be different at a plurality of positions. As such, furthermore, the resonance frequency of the elastic member 10 can be changed, and the probability of resonance of the elastic member 10 can be greatly reduced. Symmetrical arrangement can well form a uniform elastic member 10, so as to ensure the stability of the vibration of the vibration unit 90.

Figure 8:
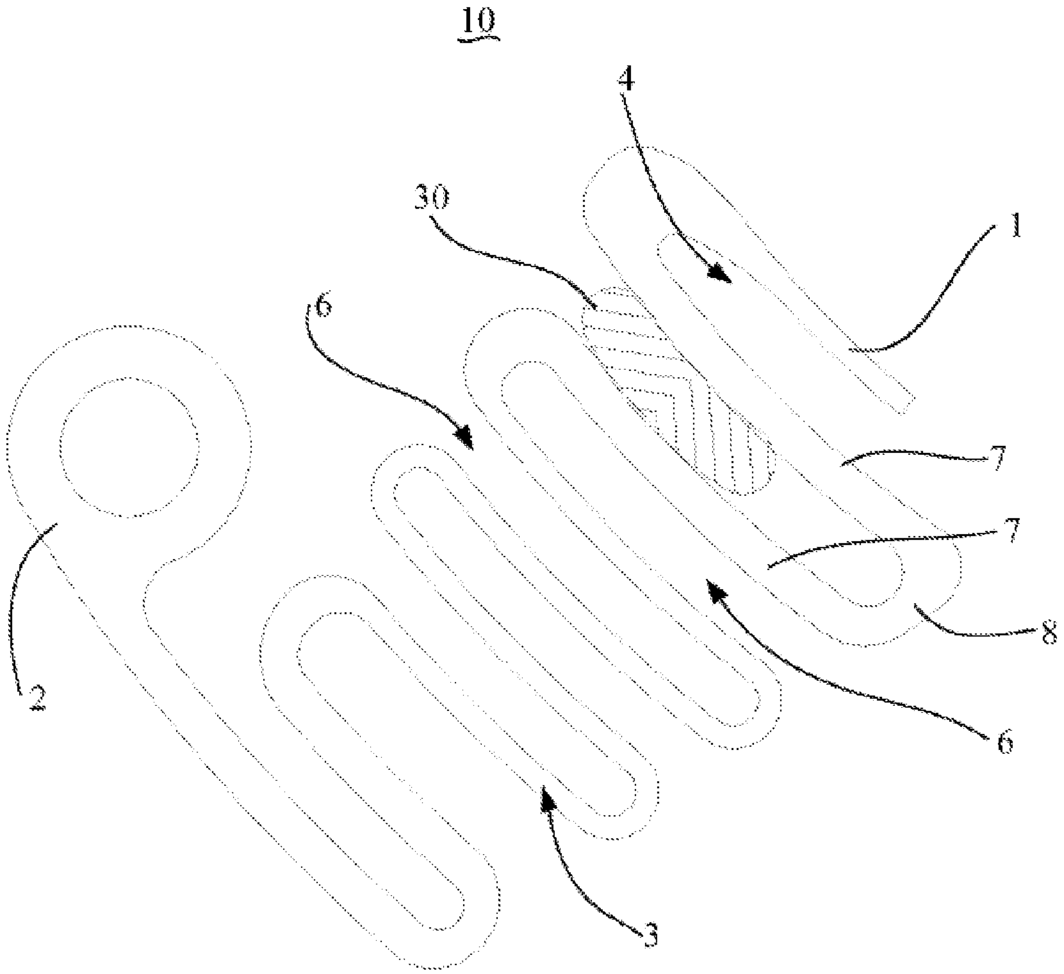
FIG. 8 is a structural schematic diagram of an elastic member of the sound production apparatus according to further another embodiment of the present disclosure.

Referring to FIG. 8, in some embodiments of the present disclosure, the wound wire-like structure includes a first line segment 7 and a second line segment 8, a line diameter of the second line segment 8 is larger than that of the first line segment 7, and the damping member 30 connects the first line segment 7 and the second line segment 8. Since the line diameter of the second line segment 8 is different from the line diameter of the first line segment 7, the energy required by the first line segment 7 and the second line segment 8 to generate vibration of the same frequency are different, and as such, furthermore, the resonance frequency of the elastic member 10 can be changed, and the probability of resonance of the elastic member 10 can be greatly reduced. It will be understood that the first line segment 7 and the second line segment 8 may be included in one of the first connecting portion 1, the second connecting portion 2 and the deformation portion 3.

In some embodiments of the present disclosure, the second line segment 8 is configured to be bent. Further, since the line diameter of the second line segment 8 is different from the line diameter of the first line segment 7, such a configuration is beneficial to reduce stress concentration, prevents breakage from occurring, and ensures the normal use of the elastic member 10.

In some embodiments of the present disclosure, both of the first line segment 7 and the second line segment 8 have a plurality of line segments, the first line segments 7 and the second line segments 8 are alternately connected, and the damping member 30 connects two of the first line segments adjacent to each other 7. In the embodiment, the bent second line segment 8 and the straight first line segment 7 are alternately arranged to form an elastic member 10 having an approximate serpentine structure or an S-shaped structure. Since the line diameter of the second line segment 8 is thick and thereby has a high structural strength, the second line segment 8 connects two of the first line segments adjacent to each other 7 so that the strength of the first line segments 7 is also high, accordingly, the strength of the elastic member 10 is increased at a plurality of positions, and on the other hand, the energy required by the elastic member 10 to generate vibration of the same frequency are different at a plurality of positions. As such, furthermore, the resonance frequency of the elastic member 10 can be changed, and the probability of resonance of the elastic member 10 can be greatly reduced.

In some embodiments of the present disclosure, the material of the damping member 30 includes metal material, rubber material, silicone material, glue material or foam cotton material; and/or, the damping member 30 is configured in a sheet-like structure or a wire-like structure.

When the material of the damping member 30 includes a metal material, the damping member 30 may be a metal wire or a metal sheet. The metal material has high structural strength and can better increase the strength of the connected part of the elastic member 10 and change the vibration frequency of the elastic member 10. In the case of a metal wire, when the elastic member 10 is a wound wire-like structure, one end of the metal wire may be wound and fixed at one position of the elastic member 10, and the other end of the metal wire may be wound and fixed at another position of the elastic member 10; when the elastic member 10 is a sheet-like structure, the damping member 30 may be connected to the elastic member 10 by bonding or welding. In the case of a metal sheet, the damping member 30 may be connected to the elastic member 10 by bonding or welding.

In some embodiments of the present disclosure, the material of the damping member 30 includes a flexible material. Specifically, the material of the damping member 30 includes rubber material and/or silicone material and/or paper material and/or leather material. It should be noted that the flexible material is a material having soft texture and certain elasticity, such material can increases the strength of the connected part of the elastic member 10, and the connected part is elastically connected, and can change the vibration frequency of the elastic member 10, and avoid resonance to the greatest extent without affecting the elasticity of the elastic member 10 itself, thereby greatly improving the sound production effect of the sound production apparatus 100. In an embodiment, rubber material and/or silicone material may be used, and specifically liquid silicone or rubber may be used, so that the liquid silicone or rubber may be applied to the elastic member 10, and the silicone or rubber may become the damping member 30 after curing. In the present embodiment, the damping member 30 may be coated onto the surface of the sheet-like elastic member 10 or may be coated to the vibration gap of the wire-like elastic member 10, and both of which can well improve the resonance of the elastic member 10. When the material of the damping member 30 includes paper material and/or leather material, the damping member 30 may be fixed by using glue, and the specific effect can be referred to the above, which will not be repeated here.

In some embodiments of the present disclosure, the material of the damping member 30 includes a glue material. The glue material may form a damping member 30 with certain elastic deformation ability after curing. Specifically, the glue material may be resin glue, silicone glue, rubber glue, etc. The damping member 30 formed by the glue material after curing can increase the strength of the connected part of the elastic member 10, and the connected part is elastically connected, and can change the vibration frequency of the elastic member 10, avoid resonance to the greatest extent without affecting the elasticity of the elastic member 10 itself, thereby greatly improving the sound production effect of the sound production apparatus 100.

In some embodiments of the present disclosure, the damping member 30 is a foam cotton material, which has very good shielding effect at low pressure, has elastic, light weight, and has good corrosion resistance. When foam cotton is used, the foam cotton may be fixed to the elastic member 10 by bonding. The elastic member 10 of the foam cotton type material can increase the strength of the connected part of the elastic member 10, elastically connect the connected part, and can change the vibration frequency of the elastic member 10, avoid resonance to the greatest extent without affecting the elasticity of the elastic member 10 itself, thereby greatly improving the sound production effect of the sound production apparatus 100.

In some embodiments of the present disclosure, the damping member 30 is provided in a bump-shape structure, a flat plate-shape structure or an arc-shape structure. The bump-shape structure may be a structure in which the damping member is substantially configured in a block-shaped structure, and both sides of the block-shaped structure protrude to form glue dots, or the damping member is a spherical structure, and two opposite sides of the spherical structure are provided with protruded glue dots, or the damping member is a plurality of point-shape structures attached to the elastic member, as such, all of the above can improve the local elasticity of the elastic member 10 and can reduce the resonance between the elastic member 10 and the vibration unit 90. The flat plate-shape structure may allow the damping member 30 and the elastic member 10 to have a large bonding area, so that the damping member 30 can be easily disposed in the first deformation area having a larger area, and the resonance between the elastic member 10 and the vibration unit 90 can be reduced. In addition, the arc-shape structure may allow the damping member 30 to have certain elastic deformation function, so as to improve the local elasticity of the elastic member 10 and reduce the resonance between the elastic member 10 and the vibration unit 90.

It will be understood that the sound production apparatus 100 may be a rectangular sound production apparatus 100 or a circular sound production apparatus 100. In the case of a rectangular sound production apparatus 100, the magnetic steel in a central portion is also configured in a long strip rectangular shape, and correspondingly, the sound production apparatus 100 is also configured in a rectangular shape. Compared to a circular sound production apparatus 100, such structure has higher space utilization when it is applied to an electronic device. Meanwhile, under the premise of the same area, the elongated diaphragm 91 is more likely to obtain larger amplitudes. The sound production apparatus 100 of the present disclosure may also be provided, as a whole, in a structure which is thinner in up and down directions. Accordingly, the sound production apparatus 100 of the present disclosure is easier to be applied in a flat installation space.

The present disclosure also provides an electronic device, the electronic device includes a sound production apparatus 100 including a holder 80, a vibration unit 90, an elastic member 10, and a damping member 30, wherein the elastic member 10 connects the holder 80 and the vibration unit 90, and the damping member 30 is disposed on the elastic member 10. Since the electronic device applies all the technical solutions in the above-mentioned embodiments, it at least has all the beneficial effects obtained by the technical solutions of the above embodiments, which will not be repeated here.

The above only describes the preferred embodiments of the present disclosure, and is not intended to limit the scope of the present disclosure. Any equivalent structural transformation made by using the contents of the description and drawings of the present disclosure within the inventive concept of the present disclosure, or direct/indirect application in other relevant technical fields, is included in the scope of patent protection of the present disclosure.

What is claimed is:

1. A sound production apparatus comprising a holder, a vibration unit, an elastic member and a damping member, wherein the elastic member connects the holder and the vibration unit, and the damping member is provided on the elastic member, wherein at least part of the elastic member is a wound wire-like structure, the wound wire-like structure has a plurality of continuous line segments, and the damping member connects at least two of the line segments.

2. The sound production apparatus of claim 1, wherein the elastic member comprises a first deformation area and a second deformation area, a deformation amount of the first deformation area is greater than a deformation amount of the second deformation area, and the damping member is provided at the first deformation area.

3. The sound production apparatus of claim 1, wherein the damping member is elastically deformable.

4. The sound production apparatus of claim 1, wherein the elastic member comprises:

a first connecting portion connected with the vibration unit;

a second connecting portion connected with the holder;

a deformation portion having one side connected to the first connecting portion and the other side connected to the second connecting portion; and the damping member provided between the first connecting portion and the second connecting portion.

5. The sound production apparatus of claim 4, wherein a first vibration gap is formed between the first connecting portion and the deformation portion, and the damping member is filled in the first vibration gap;

and a second vibration gap is formed between the second connecting portion and the deformation portion, and the damping member is filled in the second vibration gap;

and the deformation portion is a wound long strip structure, the deformation portion is provided with a third vibration gap, and the damping member is filled in the third vibration gap.

6. The sound production apparatus of claim 1, wherein the elastic member comprises:

a first connecting portion connected with the vibration unit;

a second connecting portion connected with the holder; and a deformation portion having one side connected to the first connecting portion and the other side connected to the second connecting portion, the first connecting portion is provided with at least two line segments, the damping member connects the at least two line segments of the first connecting portion, the second connecting portion is provided with at least two line segments, and the damping member connects the at least two line segments of the second connecting portion.

7. The sound production apparatus of claim 6, wherein the deformation portion comprises a first end connected to one of the first connecting portion and the second connecting portion, and a second end connected to the other one of the first connecting portion and the second connecting portion, and a central area is provided between the first end and the second end;

wherein the first end extends to the central area in a straight line and/or a curve along a first direction to form a first deformation section, wherein the first deformation section located in the central area extends to the second end in a straight line and/or a curve along a direction opposite to the first direction to form a second deformation section, and the first deformation section and the second deformation section are connected to form the deformation portion; and wherein the deformation portion is defined to have a long axis and a short axis that are perpendicular to each other, the first connecting portion and the second connecting portion are spaced apart in a length direction of the short axis, and the damping member is positioned at the deformation portion and is disposed in a length direction of the long axis.

8. The sound production apparatus of claim 7, wherein a plurality of damping members are provided, and the plurality of damping members are symmetrically arranged on both sides of the short axis in the length direction of the long axis.

9. The sound production apparatus of claim 7, wherein a position where the first deformation section and the second deformation section are connected is defined as a center of the deformation portion, and the damping member is disposed at the center of the deformation portion.

10. The sound production apparatus of claim 9, wherein a position where the first deformation section and the second deformation section are connected is defined as a center of the deformation portion, a plurality of damping members are provided, and the plurality of damping members are symmetrically disposed around the center of the deformation portion.

11. The sound production apparatus of claim 7, wherein at least part of the first deformation section and at least part of the second deformation section are disposed adjacent to each other and form a deformation gap, and the damping member is filled in the deformation gap.

12. The sound production apparatus of claim 1, wherein a plurality of damping members are provided, and the plurality of damping members are evenly distributed between the first connecting portion and the second connecting portion.

13. The sound production apparatus of claim 1, wherein the elastic member is an axisymmetric structure with a symmetric line, and in the case where a plurality of damping members are provided, the plurality of damping members are symmetrically arranged on both sides of the symmetric line.

14. The sound production apparatus of claim 1, wherein the plurality of line segments of the wound wire-like structure include a first line segment and a second line segment, a line diameter of the second line segment is larger than a line diameter of the first line segment, and the damping member connects the first line segment and the second line segment, wherein the second line segment is provided in a bending shape.

15. The sound production apparatus of claim 14, wherein a plurality of first line segments and a plurality of second line segments are provided, the first line segments and the second line segments are configured to be alternately connected, and the damping member connects two of the first line segments adjacent to each other.

16. The sound production apparatus of claim 1, wherein the material of the damping member comprises metal material, rubber material, silicone material, glue material or foam cotton material; and/or the damping member is provided in a bump-like structure, a flat plate-like structure or an arc-shape structure.

17. The sound production apparatus of claim 1, wherein the material of the damping member comprises a flexible material.

18. The sound production apparatus of claim 1, wherein the vibration unit comprises a diaphragm and a voice coil connected with the diaphragm, and the elastic member connects the voice coil and the holder; or the vibration unit comprises a diaphragm, a voice coil and a cup, the voice coil and the cup are disposed on the same side of the diaphragm, and the elastic member connects the cup and the holder;

and/or, the holder is a housing or a magnetic yoke.

19. An electronic device, comprising the sound production apparatus of claim 1.

* * * * *